United States Patent
Amsellem et al.

(10) Patent No.: US 10,900,347 B2
(45) Date of Patent: Jan. 26, 2021

(54) BOP ELASTOMER HEALTH MONITORING

(71) Applicant: Cameron International Corporation, Houston, TX (US)

(72) Inventors: Olivier Amsellem, Clamart (FR); Alice Chougnet-Sirapian, Clamart (FR); Matthew Givens, Houston, TX (US); Fadhel Rezgui, Clamart (FR); Remi Robutel, Clamart (FR); Ray Zonoz, Sugarland, TX (US)

(73) Assignee: Cameron International Corporation, Houston, TX (US)

( * ) Notice: Subject to any disclaimer, the term of this patent is extended or adjusted under 35 U.S.C. 154(b) by 248 days.

(21) Appl. No.: 15/909,380

(22) Filed: Mar. 1, 2018

(65) Prior Publication Data

US 2019/0271225 A1    Sep. 5, 2019

(51) Int. Cl.
| | |
|---|---|
| *E21B 47/06* | (2012.01) |
| *E21B 33/06* | (2006.01) |
| *G01M 3/28* | (2006.01) |
| *E21B 47/117* | (2012.01) |
| *E21B 33/064* | (2006.01) |

(52) U.S. Cl.
CPC ............ *E21B 47/06* (2013.01); *E21B 33/061* (2013.01); *E21B 33/063* (2013.01); *E21B 47/117* (2020.05); *G01M 3/2876* (2013.01); *E21B 33/064* (2013.01)

(58) Field of Classification Search
CPC ............................... E21B 47/06; E21B 33/063
See application file for complete search history.

(56) References Cited

U.S. PATENT DOCUMENTS

| | | | |
|---|---|---|---|
| 3,693,431 | A  | 9/1972  | King |
| 4,096,739 | A  | 6/1978  | Barker et al. |
| 4,101,612 | A  | 7/1978  | Barker et al. |
| 4,922,423 | A  | 5/1990  | Koomey et al. |
| 6,032,736 | A  | 3/2000  | Williams |
| 6,955,357 | B2 | 10/2005 | Griffin et al. |
| 7,062,960 | B2 | 6/2006  | Couren et al. |
| 7,274,989 | B2 | 9/2007  | Hopper |
| 7,665,355 | B2 | 2/2010  | Zhang et al. |
| 8,781,743 | B2 | 7/2014  | McKay et al. |

(Continued)

FOREIGN PATENT DOCUMENTS

| | | |
|---|---|---|
| CN | 103868784 A | 6/2014 |
| WO | 2009022286 A2 | 2/2009 |
| WO | 2016123502 A1 | 8/2016 |

OTHER PUBLICATIONS

MDT Modular Formation Dynamics Tester, Schlumberger brochure, 11 pages, Jun. 2002.

(Continued)

*Primary Examiner* — Jamel E Williams
(74) *Attorney, Agent, or Firm* — Rachel Greene (57) ABSTRACT

The service life of a packer element, an annular BOP, is estimated using one pressure sensor below the elastomer seal or two pressure sensors positioned above and below the elastomer seal. The pressure variations below the elastomer are monitored versus piston position and used to detect elastomer wear with time/pressure cycles. The pressure variations above the elastomer can be used to detect potential leakage, as well as leak characteristics such as leaking rate or leak geometry.

17 Claims, 7 Drawing Sheets

(56) References Cited

U.S. PATENT DOCUMENTS

| | | |
|---|---|---|
| 8,978,699 B2 | 3/2015 | Jaffrey et al. |
| 9,163,471 B2 | 10/2015 | Coonrod et al. |
| 9,187,974 B2 | 11/2015 | Coonrod et al. |
| 9,616,659 B2 | 4/2017 | Morikawa |
| 9,804,039 B2 | 10/2017 | Reyes, III et al. |
| 9,822,603 B2 | 11/2017 | Whitby |
| 9,957,771 B2 | 5/2018 | Jaffrey et al. |
| 9,970,569 B2 | 5/2018 | Kotrla et al. |
| 10,000,987 B2 | 6/2018 | Springett et al. |
| 10,087,745 B2 | 10/2018 | Gottlieb et al. |
| 10,161,225 B2 | 12/2018 | Jaffrey et al. |
| 10,190,380 B2 | 1/2019 | Trivedi et al. |
| 10,233,715 B2 | 3/2019 | Zonoz et al. |
| 10,267,705 B2 | 4/2019 | Hilpert et al. |
| 10,273,774 B2 | 4/2019 | Jaffrey |
| 10,273,793 B2 | 4/2019 | Johnson et al. |
| 10,570,689 B2 | 2/2020 | Jaffrey |
| 10,585,068 B2 | 3/2020 | Gottlieb et al. |
| 2003/0000693 A1 | 1/2003 | Couren et al. |
| 2004/0075218 A1 | 4/2004 | Heinzen |
| 2004/0083818 A1 | 5/2004 | Foote et al. |
| 2004/0173363 A1 | 9/2004 | Navarro-Sorroche |
| 2008/0196491 A1 | 8/2008 | Ricotti et al. |
| 2008/0236271 A1 | 10/2008 | Zhang et al. |
| 2009/0159292 A1 | 6/2009 | Guerrero et al. |
| 2009/0315267 A1 | 12/2009 | Castleman |
| 2010/0212891 A1 | 8/2010 | Stewart et al. |
| 2010/0294482 A1 | 11/2010 | Araujo et al. |
| 2011/0284216 A1 | 11/2011 | Addis et al. |
| 2012/0227987 A1 | 9/2012 | Castriotta et al. |
| 2013/0054034 A1 | 2/2013 | Ebenezer |
| 2013/0153241 A1 | 6/2013 | Mallinson et al. |
| 2013/0192359 A1 | 8/2013 | Pelletier et al. |
| 2013/0311093 A1 | 11/2013 | Winters et al. |
| 2013/0341538 A1 | 12/2013 | Huang |
| 2014/0231075 A1 | 8/2014 | Springett et al. |
| 2014/0246238 A1* | 9/2014 | Abbassian ............... E21B 47/10 175/40 |
| 2015/0007651 A1 | 1/2015 | Reyes, III et al. |
| 2015/0068758 A1 | 3/2015 | Leuchtenberg et al. |
| 2015/0285054 A1 | 10/2015 | Johnson et al. |
| 2015/0330173 A1* | 11/2015 | Trivedi ................... E21B 33/06 73/152.29 |
| 2016/0123785 A1 | 5/2016 | Gaude |
| 2016/0186516 A1 | 6/2016 | Jaffrey |
| 2016/0290889 A1 | 10/2016 | Hilpert et al. |
| 2017/0009550 A1 | 1/2017 | Leuchtenberg et al. |
| 2017/0130562 A1* | 5/2017 | Jaffrey ................. E21B 33/061 |
| 2017/0130575 A1* | 5/2017 | Jaffrey ................... E21B 33/06 |
| 2018/0023361 A1 | 1/2018 | Zonoz et al. |
| 2019/0017967 A1 | 1/2019 | Gottlieb et al. |
| 2019/0162042 A1 | 5/2019 | Leuchtenberg et al. |
| 2019/0211643 A1 | 7/2019 | Jaffrey |
| 2019/0226295 A1* | 7/2019 | Zonoz ................... C09K 8/422 |

OTHER PUBLICATIONS

Signature CGG Crystal Quartz Gauge, Schlumberger brochure, 2 pages, 2013.

Piezotron by Kistler, "Minature, High Sensitivity, Voltage Output Pressure Sensors" Type 211B (Year:2012).

Schotzko et al., "Embedded Strain Gauges for Condition Monitoring of Silicone Gaskets, " 2014,Sensors, 14, 12387-12398 (Year: 2014).

Siouris et al., "Method for the evaluation of elastomeric seals by compression stress relaxation," Jul. 2013, Polymer Testing 32 1299-1305 (Year: 2013).

* cited by examiner

BOP ELASTOMER HEALTH MONITORING

TECHNICAL FIELD

The present disclosure relates to systems and methods for elastomer characterization. More specifically, the present disclosure relates to systems and methods that use fluid pressure measurements to evaluate characteristics such as health of elastomeric components used in blowout preventers.

BACKGROUND

Elastomeric materials are used for a variety of applications in many different settings. In the oil and gas industry, elastomer material is used in many components including seals, donuts, and packers. In many situations such as in the oil and gas industry, in situ monitoring the elastomer properties, such as for fatigue due to temperature and/or pressure cycling, is either impossible or impractical due to the inaccessibility of the component and/or a relatively high intervention cost.

In well drilling operations such as in the oil and gas industry, blowout preventers (BOPs) are an important safety "valve" for well pressure control. Each of the elastomer packer elements of a BOP has an operational lifetime or service life. The service life of the packer element is influenced by the operation conditions, such as closing/opening cycles, pressures, temperatures, exposed chemicals etc. The service life can be significantly reduced due to the adverse operation conditions such as high operation pressures, temperatures and harsh chemicals. This situation causes significant challenges in predicting the service life of packer element of BOPs. In a real well blowout situation, a misprediction on service life of packer element of BOP could have severe consequences. Therefore, a reasonable prediction of the service life of packer element of BOP could not only reduce the operation cost, but also increase the safety confidence level during operation. In subsea BOPs, the prediction of service life of packer element becomes even more important because it is extremely expensive to replace the packer element in subsea installation. Furthermore, the subsea environment requires an even higher safety confidence level for BOPs during operation. Hence, a reliable method to monitor the service life of elastomeric packer elements in BOPs in the oil and gas wells is highly desirable.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

According to some embodiments, a method of monitoring service life characteristics of an elastomer component in a BOP is described. The elastomer component is used for sealing in a central bore of the BOP. The method includes: measuring in situ on the BOP while deployed at wellsite, fluid pressure within the central bore of the BOP at a first location using a first pressure sensor; and estimating a service life characteristic of the elastomer component based at least in part on the in situ fluid measurement at the first location.

According to some embodiments, the first pressure sensor has a typical accuracy of at least $1 \times 10^{-3}$ of full scale, and is typically stable to $10^{-4}$ of full scale in less than 10 seconds following a pressure transient. According to some other embodiments, the first pressure sensor has a typical accuracy of at least $1.5 \times 10^{-4}$ of full scale. According to some embodiments, the first pressure sensor includes at least one silicon piezo resistor elements mounted on an insulating substrate.

According to some embodiments, the first location is below the elastomer component, and the estimating of the elastomer volume or changes in elastomer volume is estimated based at least in part on measurements of fluid pressure from the first pressure sensor during movement of a piston of the BOP used to actuate the sealing in the central bore of the BOP. According to some embodiments, the estimating elastomer volume or changes in elastomer volume includes determining a change in effective fluid height above the first location.

According to some embodiments, the method further comprises measuring in situ on the BOP while deployed at wellsite, fluid pressure within the central bore of the BOP at a second location using a second pressure sensor, first location being below the elastomer component and the second location being above the elastomer component.

According to some embodiments, the method further includes calibrating at least one of the pressure sensors based at least in part on a pressure differential between the first and second locations from measurements made by the first and second sensors while the BOP bore is not sealed, a known vertical distance between the first and second locations, and a known density of fluid within the central bore. According to some embodiments, the estimating of the service life characteristic includes detecting potential leakage of the sealing in the central bore due to elastomer wear based at least in part on measurements made by the first and second pressure sensors while the central bore of the BOP is in a sealed configuration. According to some embodiments, leak flow rate and/or effective leak channel diameter are estimated in cases where potential leakage is detected.

BRIEF DESCRIPTION OF THE DRAWINGS

The subject disclosure is further described in the following detailed description, and the accompanying drawings and schematics of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The particulars shown herein are for purposes of illustrative discussion of the embodiments of the present disclosure only. In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice.

According to some embodiments, novel techniques are described to monitor the service life of packer element for annular BOPs. According to some embodiments, high-quality pressure sensors are positioned above and below the elastomer seal of the BOP. The pressure variations measured below the elastomer are monitored vs. piston position and/or time. The measured variations can be used to detect elastomer wear that can occur over time and/or after pressure cycles. The pressure variations measured above the elastomer seal can be used to detect possible elastomer leakage and in some cases estimate the leakage rate. Finally, the differential pressure between the two sensors can also be monitored which can be used for micro-leak geometry characterization.

Figure 1:
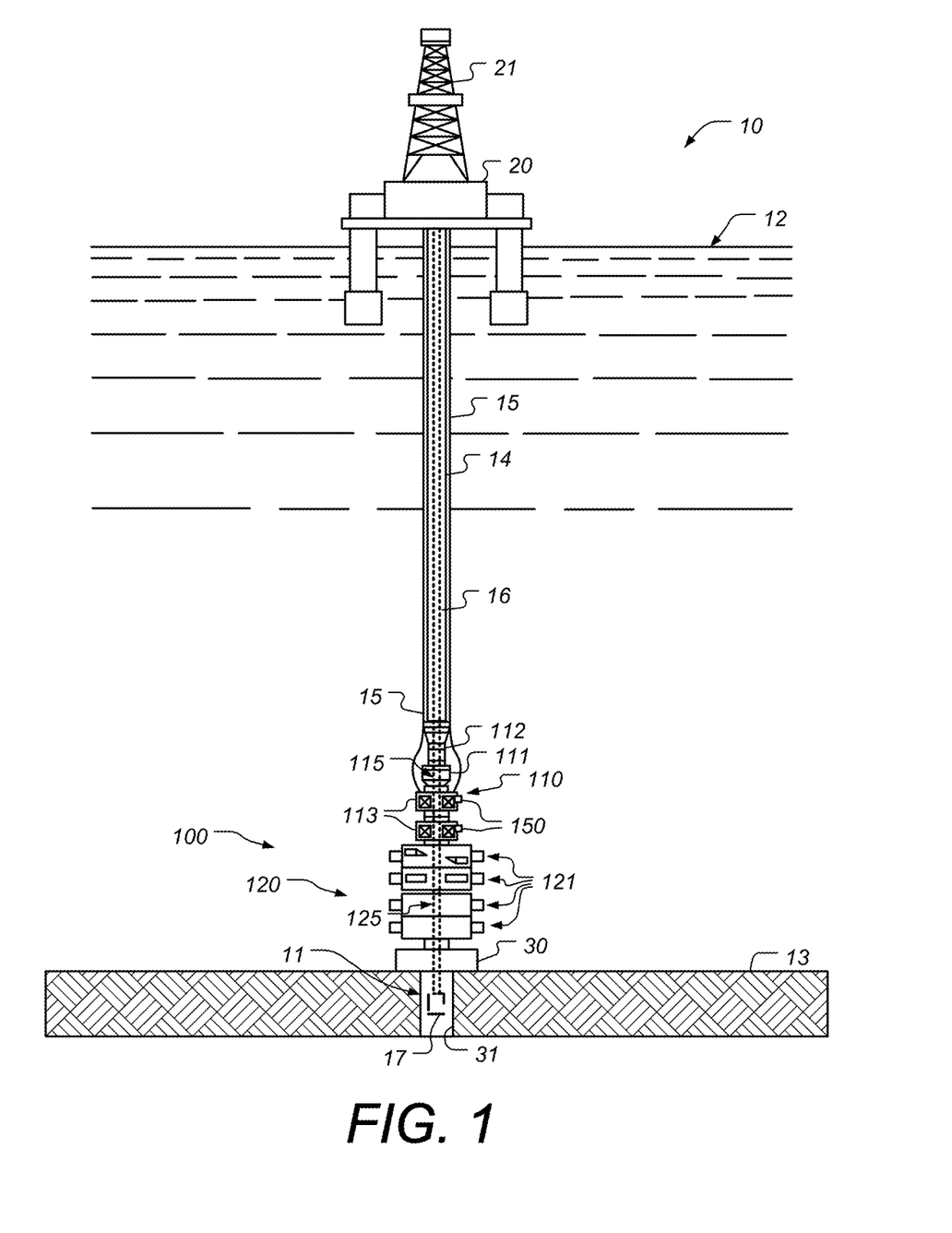
FIG. 1 is a diagram illustrating a drilling and/or producing wellsite where an elastomer health monitoring system could be deployed, according to some embodiments.

FIG. 1 is a diagram illustrating a drilling and/or producing wellsite where an elastomer health monitoring system could be deployed, according to some embodiments. In this example, an offshore drilling system is being used to drill a wellbore 11. The system includes an offshore vessel or platform 20 at the sea surface 12 and a subsea blowout preventer (BOP) stack assembly 100 mounted to a wellhead 30 at the sea floor 13. The platform 20 is equipped with a derrick 21 that supports a hoist (not shown). A tubular drilling riser 14 extends from the platform 20 to the BOP stack assembly 100. The riser 14 returns drilling fluid or mud to the platform 20 during drilling operations. One or more hydraulic conduit(s) 15 extend along the outside of the riser 14 from the platform 20 to the BOP stack assembly 100. The conduit(s) 15 supplies pressurized hydraulic fluid to the assembly 100. Casing 31 extends from the wellhead 30 into the subterranean wellbore 11.

Downhole operations, such as drilling, are carried out by a tubular string 16 (e.g., drillstring) that is supported by the derrick 21 and extends from the platform 20 through the riser 14, through the BOP stack assembly 100, and into the wellbore 11. In this example, a downhole tool 17 is shown connected to the lower end of the tubular string 16. In general, the downhole tool 17 may comprise any suitable downhole tool(s) for drilling, completing, evaluating, and/or producing the wellbore 11 including, without limitation, drill bits, packers, cementing tools, casing or tubing running tools, testing equipment and/or perforating guns. During downhole operations, the string 16, and hence the tool 17 coupled thereto, may move axially, radially, and/or rotationally relative to the riser 14 and the BOP stack assembly 100.

The BOP stack assembly 100 is mounted to the wellhead 30 and is designed and configured to control and seal the wellbore 11, thereby containing the hydrocarbon fluids (liquids and gases) therein. In this example, the BOP stack assembly 100 comprises a lower marine riser package (LMRP) 110 and a BOP or BOP stack 120. The LMRP 110 includes a riser flex joint 111, a riser adapter 112, one or more annular BOPs 113, and a pair of redundant control units or pods. A flow bore 115 extends through the LMRP 110 from the riser 14 at the upper end of the LMRP 110 to the connection at the lower end of the LMRP 110. The riser adapter 112 extends upward from the flex joint 111 and is coupled to the lower end of the riser 14. The flex joint 111 allows the riser adapter 112 and the riser 14 connected thereto to deflect angularly relative to the LMRP 110, while wellbore fluids flow from the wellbore 11 through the BOP stack assembly 100 into the riser 14. The annular BOPs 113 each include annular elastomeric sealing elements that are mechanically squeezed radially inward to seal on a tubular extending through the LMRP 110 (e.g., the string 16, casing, drillpipe, drill collar, etc.) or seal off the flow bore 115. Thus, the annular BOPs 113 have the ability to seal on a variety of pipe sizes and/or profiles, as well as perform a "Complete Shut-off" (CSO) to seal the flow bore 115 when no tubular is extending therethrough. According to some embodiments, each of the BOPs 113 includes one or more pressure sensors 150 that are configured to make pressure measurements on fluid within flow bore 115. According to some embodiments, each BOP 113 includes such pressure sensors positioned such that pressure can be measured above and below the elastomeric sealing element of each BOP. As will be described in further detail, infra, the pressure measurements are recorded and analyzed for that the health of the elastomeric sealing elements can be evaluated.

In this embodiment, the BOP stack 120 comprises one or more of the annular BOPs 113 as previously described with pressure sensor(s) 115, choke/kill valves, and choke/kill lines. A main bore 125 extends through the BOP stack 120. In addition, the BOP stack 120 includes a plurality of axially stacked ram BOPs 121. Each ram BOP 121 includes a pair of opposed rams and a pair of actuators that actuate and drive the matching rams. In this embodiment, the BOP stack 120 includes four ram BOPs 121—an upper ram BOP 121 including opposed blind shear rams or blades for severing the tubular string 16 and sealing off the wellbore 11 from the riser 14; and the three lower ram BOPs 120 including the opposed pipe rams for engaging the string 16 and sealing the annulus around the tubular string 16. In other embodiments, the BOP stack (e.g., the stack 120) may include a different number of rams, different types of rams, one or more annular BOPs, or combinations thereof.

Figure 2:
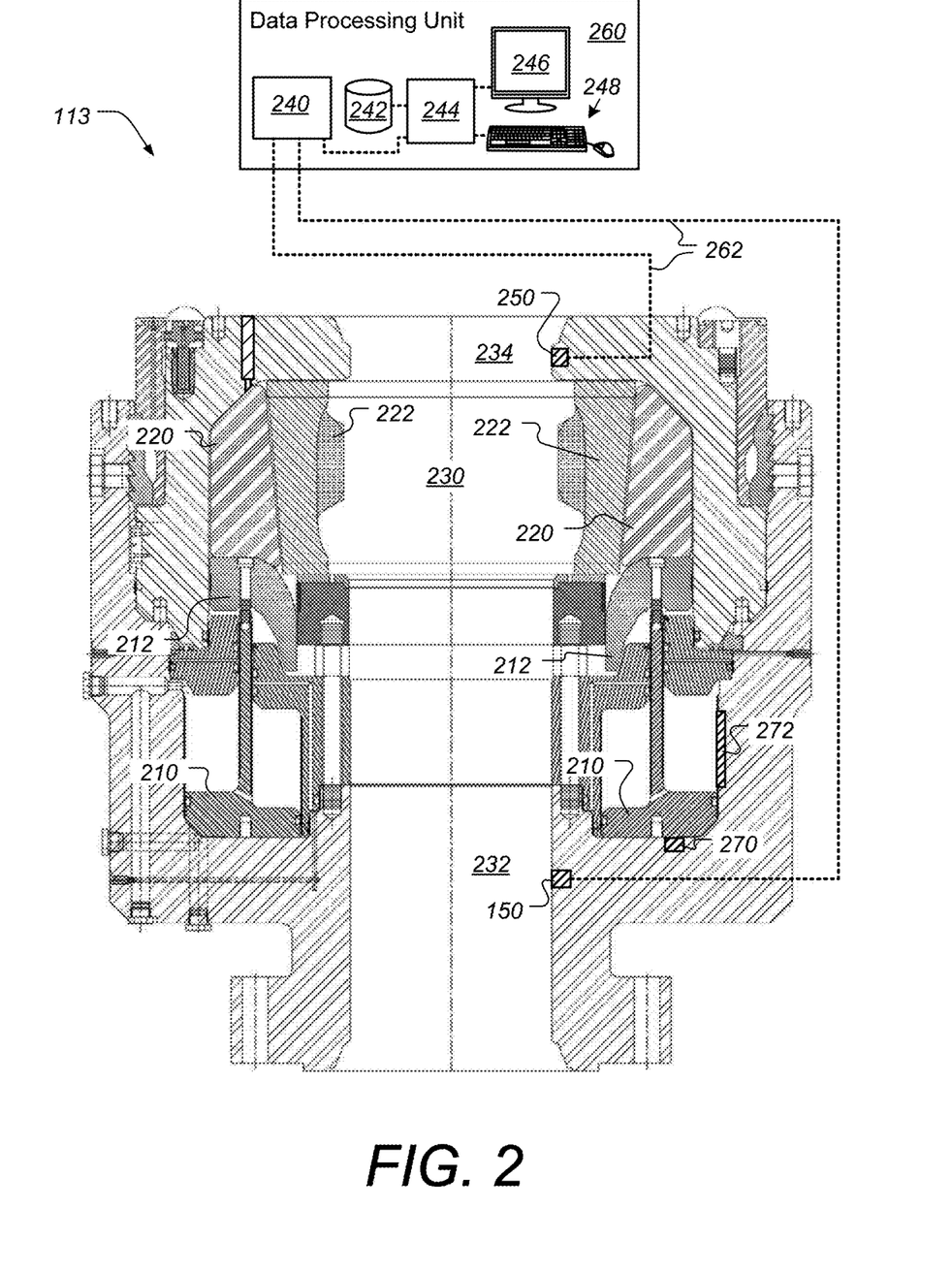
FIG. 2 is a cross section of an annular BOP that includes pressure sensors for use in an elastomer health monitoring system, according to some embodiments.

FIG. 2 is a cross section of an annular BOP that includes pressure sensors for use in an elastomer health monitoring system, according to some embodiments. In this example, the annular BOP 113 includes two elastomer components: donut 220 and packer 222. In order to close and seal the BOP 113, hydraulic fluid enters below piston 210 and pushes it upwards. The piston 210 lifts pusher plate 212, which in turn pushes on donut 220. The pressure on donut 220 forces the packer 222 radially inwards to form a seal with any tube within the BOP bore 230 (or sealing off the bore 230 if there is no tube or pipe present). Note that bore 230 in FIG. 2 can correspond to flow bore 115 in LMRP 110 and/or main bore 125 in BOP stack 120, as shown in FIG. 1. To re-open the BOP 113, the hydraulic fluid enters above the piston 210 thereby forcing it back downwards. In some embodiments, separate pistons can be used for opening and closing the BOP 113. A pressure sensor 150 is installed within BOP 113 as shown and is configured to measure fluid pressure in region 232 which is below packer 222—the sealing element of the BOP 113. According to some embodiments, a second pressure sensor 250 is installed as shown and is configured to measure fluid pressure in region 234 that is above packer 222.

Also shown in FIG. 2 is data processing unit 260, which according to some embodiments, includes a central processing system 244, a storage system 242, communications and input/output modules 240, a user display 246 and a user input system 248. Input/output modules 240 are in data communication with the sensor 150 as shown by the dotted line. The data processing unit 260 may be located in offshore vessel or platform 20 (shown in FIG. 1), or may be located in other facilities near the wellsite or in some remote location. According to some embodiments, processing unit 260 is also used to monitor and control at least some other aspects of drilling operations or other functions on vessel or platform 20 (shown in FIG. 1).

According to some embodiments, sensors 150 and 250 are either battery powered, supplied by power from an offshore vessel such as platform 20 or from the BOP stack assembly 100 (both shown in FIG. 1). A data transmission/link, represented by dotted lines 262 can be wired to an acquisition system in data processing unit 260, or make use of wireless transmission technology such as acoustic telemetry (e.g. in subsea) or radio-frequency (e.g. on surface). The storage system 242 can be a part of the surface acquisition system, or it could be embedded at the sensor level or at the BOP stack level.

According to some embodiments, BOP 113 includes the ability to determine the position of piston 210 during the closing process. In some cases, an ultrasonic technique can be used. In such cases, a sensor module 270 is provided that includes an ultrasonic transducer, temperature sensor and pressure sensor. Further details of using ultrasonic techniques for determining location of a piston in a subsea device is provided in co-owned U.S. Pat. Nos. 9,163,471, 9,187,974 and 9,804,039, which are incorporated herein by reference. According to some other embodiments, coil assembly 272, together with the movable piston 210 forms a linear variable differential transformer (LVDT). Further details of using LVDT techniques for determining location of a movable element within a container is provided in co-owned U.S. Pat. App. Publ. 2016/0123785, which is incorporated herein by reference.

Figure 3:
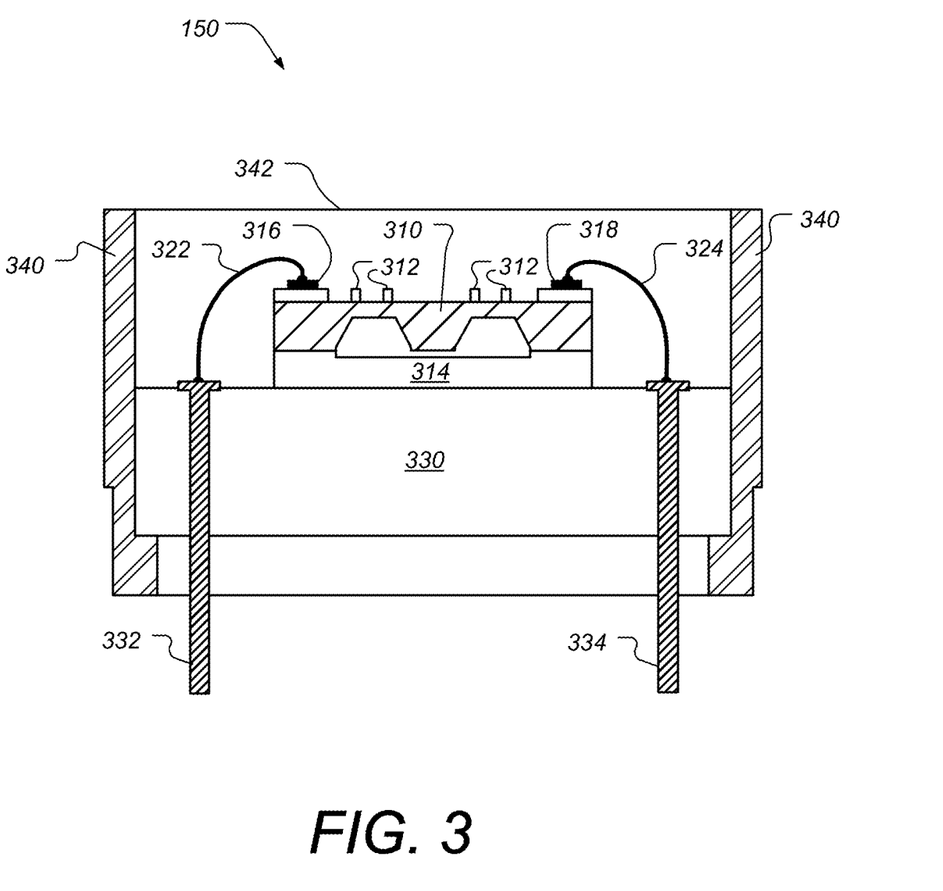
FIG. 3 is a schematic diagram showing aspects of a pressure sensor for use in an elastomer health monitoring system, according to some embodiments.

FIG. 3 is a schematic diagram showing aspects of a pressure sensor for use in an elastomer health monitoring system, according to some embodiments. The sensor 150, although both pressure sensors 150 and 250 shown in FIG. 2, could be of a design shown in FIG. 3. Sensor 150 in FIG. 3 is a silicon-on-insulator (SOI) pressure gauge. A silicon sensor chip 310 is shown mounted to a glass pedestal 314. Silicon piezo resistor(s) 312 are shown which are electrically connected with metal contacts 316 and 318. The contacts 316 and 318 are connected to wires 322 and 324, and contact pins 332 and 334, respectively. The sensor structure is sealed by header glass 330, housing wall 340 and diaphragm 342. In operation, diaphragm 342 is exposed to the fluid pressure (e.g. in regions 232 and 234 shown in FIG. 2). The pressure is transmitted through diaphragm 342 and applied to the outer surface of silicon chip 310. Mechanical stress on chip 310 is measured through the piezo resistor(s) 312. Sensors such as shown in FIG. 3 can have outstanding metrology. According to some embodiments, sensors 150 and 250 are configured to monitor changes in pressure in the range of a few Pa [mpsi] per sec, and at the same time able to read pressure values up to 138 MPa [20000 psi], in a temperature range from 0 degC to 150 degC. According to some embodiments, the dynamic response is equal to or better than 100 mpsi within a 1-5 minutes, and the gauge resolution of 1-15 mpsi @ 1 Hz.

According to some embodiments a suitable pressure gauge is used which has at least the following specifications: Pressure range (FS), atm—10 kpsi; Temperature range, 85° C.-125° C.; Accuracy, Typ. $1 \times 10^{-3}$ FS; Repeatability, Typ. $1 \times 10^{-4}$ FS to $1 \times 10^{-3}$ FS; Resolution, Typ. $1 \times 10^{-5}$ FS to $1 \times 10^{-3}$ FS; Dynamic response to Pressure transient, Stabilization within $10^{-4}$ FS<1-10 s; Dynamic response to Temperature transient, Stabilization within $10^{-4}$ FS<10-30 s; Short term stability (0-4H), <100-1000 mpsi; Medium term stability (4-14H), 1-10 psi; Long term stability (>100H), 1-100 psi; Data rate, 1 Hz-10 Hz; and Reliability, 1 years—155° C.

According to some embodiments, one or more of the pressure gauges used has at least the following specifications: Pressure range (FS), 10 kpsi-30 kpsi; Temperature range, 125° C.-200° C.; Accuracy, Typ. range $0.5 \times 10^{-4}$ FS-$2 \times 10^{-4}$ FS, Max. $3 \times 10^{-4}$ FS; Repeatability, Typ. $1 \times 10^{-5}$ FS to $1 \times 10^{-4}$ FS; Resolution, Typ. $1 \times 10^{-6}$ FS to $1 \times 10^{-5}$ FS; Dynamic response to Pressure transient, Stabilization within $10^{-4}$ FS<0.1-10 s; Dynamic response to Temperature transient, Stabilization within $10^{-4}$ FS<1-30 s; Short term stability (0-4H), <1-10 mpsi; Med. term stability (4-14H), 0.1-1 psi; Long term stability (>100H), 0.1-1 psi; Data rate, 1 Hz-2000 Hz; and Reliability, 5 years-150° C.

According to some embodiments, the pressure sensors 150 and 250 are further configured to provide temperature measurements, which can be used for pressure sensor calibration. Note that although a SOI-type pressure sensor is shown in FIG. 3, according to some other embodiments, one or more other known types of pressure sensors are used for sensors 150 and/or 250 shown in FIG. 2. Examples of other types of sensors that could be suitable include: other types of pressure quartz transducers, piezoelectric resonant pressure sensors, optic fiber sensors, metallic alloy-based strain foil gauges, metallic nanowire based strain sensors, and force sensors for example based on a strain foil gauge. According to some embodiments, sensors 150 and/or 250 are of a type and design such as used in Schlumberger's Signature CQG Crystal Quartz Gauge tool and/or Schlumberger's MDT Modular Formation Dynamics Tester.

Figure 4:
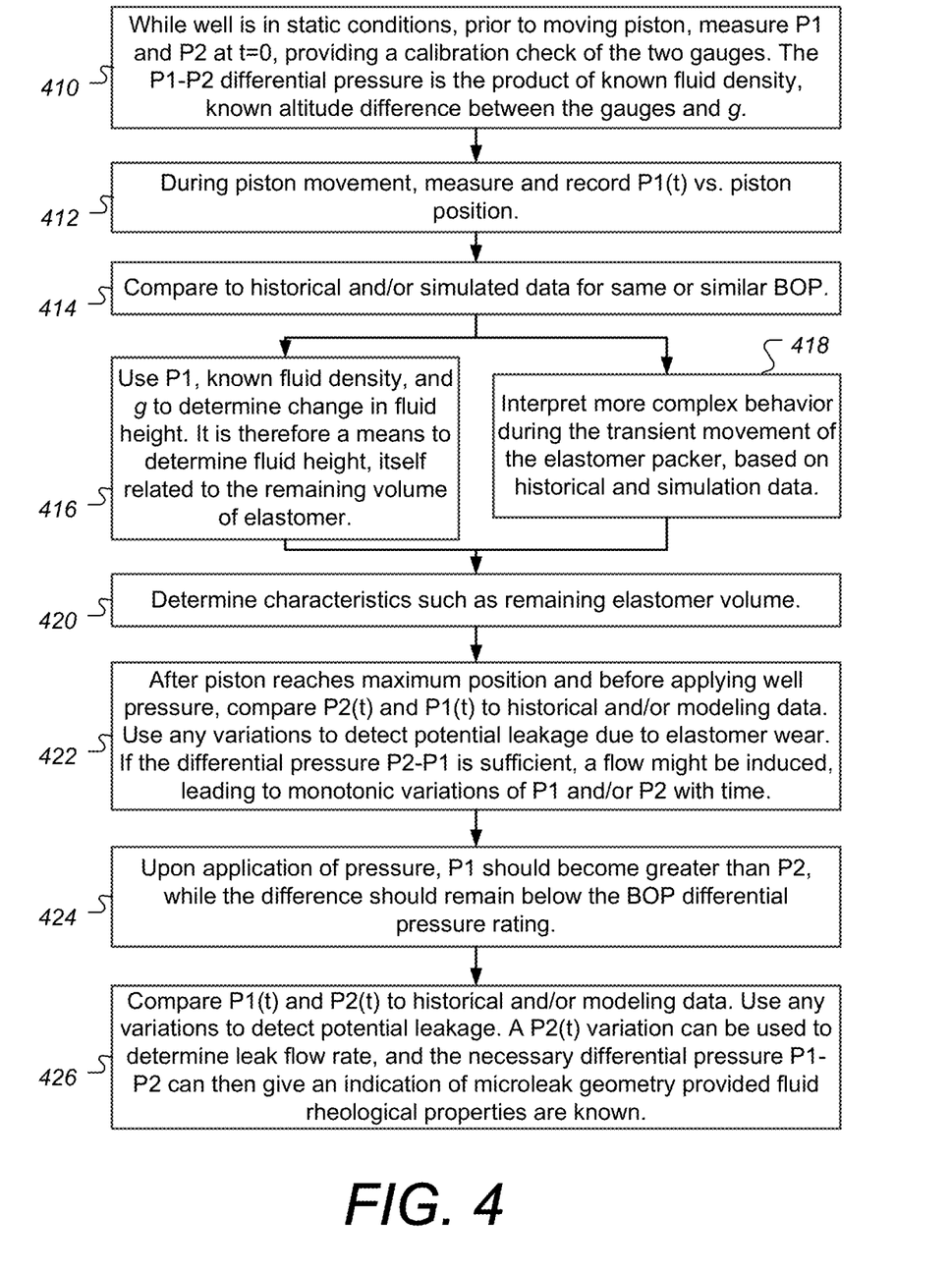
FIG. 4 is a block diagram showing aspects of determining BOP elastomer health based on fluid pressure measurements, according to some embodiments.

FIG. 4 is a block diagram showing aspects of determining BOP elastomer health based on fluid pressure measurements, according to some embodiments. It is assumed that both the geometry and the properties of the fluid that fills bore 230, flow bore 115 and main bore 125, shown in FIGS. 1 and 2, are known. The block diagram of FIG. 4 illustrates how to determine elastomer health properties based on pressure measurements during a regular subsea BOP in-situ pressure test. Two pressure measurement sensors are used: P1(t) which is positioned below the BOP sealing element (corresponding to sensor 150 shown in FIG. 2); and P2(t) which is positioned above the BOP sealing element (corresponding to sensor 250 shown in FIG. 2). During the pressure test, measurements are recorded from both pressure sensors during both (1) the piston movement phase, and (2) while the well pressure is being applied.

In block 410, before moving the piston and while the well is in static conditions, P1-P2 (t=0) measurements are used to provide an in-situ calibration check for the two sensors, since this differential pressure is the product of known fluid density, known altitude difference between the sensors and the force of gravity on Earth (g).

In block 412, during the movement of the piston for closure of the BOP, P1(t) vs. piston position is monitored and recorded. Note that as described supra, ultrasonic and/or LVDT are examples of methods that can be used for determining the piston position. In block 414, the P1(t) vs. piston position measurements are then compared to historical and/or simulated data obtained with the same or similar BOPs. Provided the fluid properties are known, as the elastomer wears and degrades, variations between the measured and historical and/or simulated P1(t) vs. piston position data will tend to change and become characteristic of the remaining elastomer volume (Block 420).

Blocks 416 and 418 illustrate two examples of how remaining elastomer volume could be determined. In block 416, an increase in the pressure P1, once the piston has reached its final position, can be used to determine the remaining volume of the elastomer. P1 is a product of the known fluid density, g, and the unknown fluid column height increase. Solving for the fluid column height increase can then be related to the remaining volume of elastomer.

Figure 5:
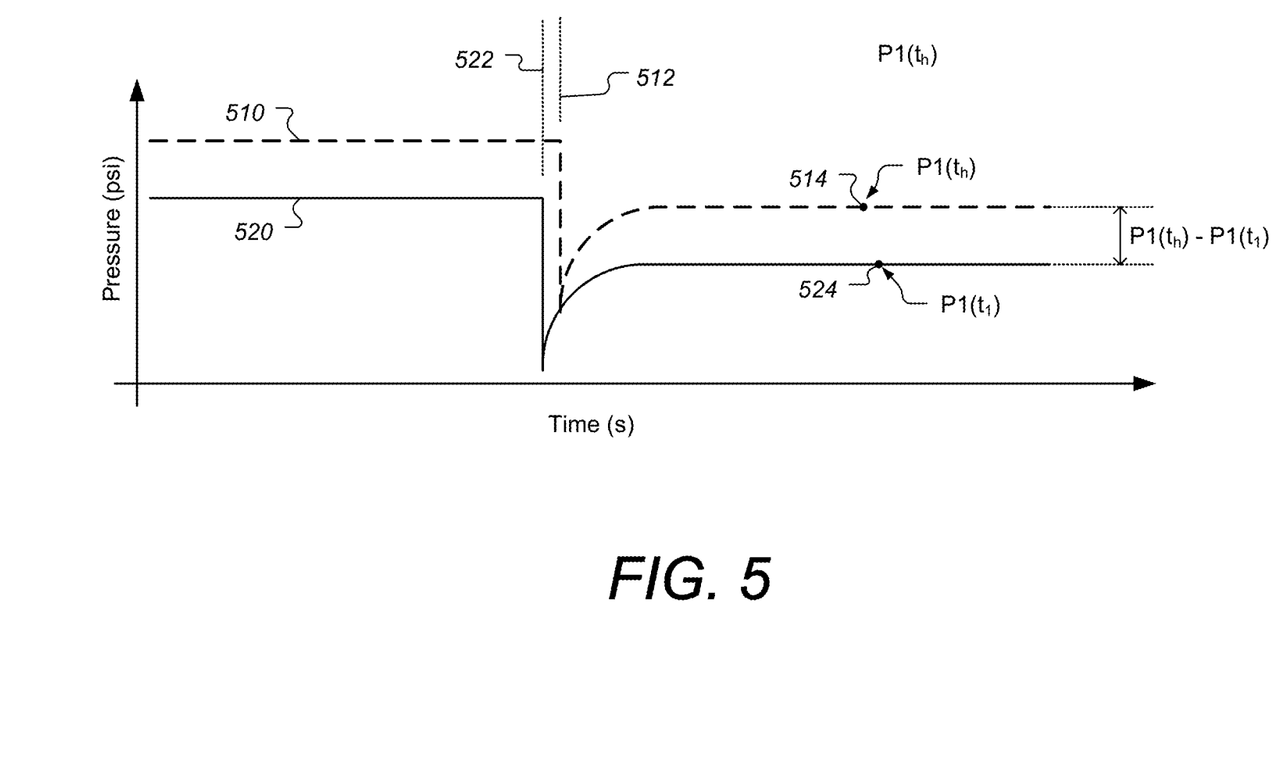
FIG. 5 is a plot illustrating aspects of determining remaining elastomer volume by comparing pressure measurements, according to some embodiments.

FIG. 5 is a plot illustrating aspects of determining remaining elastomer volume by comparing pressure measurements, according to some embodiments. A first order calculation can be used which takes into account the density change due to the replacement of the drilling fluid by the elastomer in the BOP wellbore section. The relationship is based on the change over time measured at pressure sensor P1: $k0 + k1 \cdot ((P1(t_h) - P1(t_1))/(\rho \cdot g)) + k2 \cdot ((P1(t_h) - P1(t_1))/(\rho \cdot g))^2 + k3 \cdot ((P1(t_h) - P1(t_1))/(\rho \cdot g))^3 \approx$ (volume loss). P1 is a pressure sensor below the elastomer such as sensor 150, $\rho$ is drilling fluid density, g is gravitational acceleration, k0, k1, k2 and k3 are geometric coefficients related to the packer. $t_h$ and $t_1$ are times when the BOP is closed. $t_h$ is a historical time, for example when the elastomer packer is in a new or otherwise well known state, while $t_1$ the time of the periodic check. In FIG. 5, both curves 510 and 520 show recorded pressure measurements taken in a central bore of the BOP such as by sensor 150 shown in FIG. 2. Curve 510 reflects measurements made at a the historical time (e.g. when the elastomer packer is in a new or otherwise well known state) while curve 520 reflects a measurements made recently or currently. The BOP closure is shown at times 512 and 522 for curves 510 and 520 respectively. Measurement points 514 and 524 show the P1 measurements for curves 510 and 520 respectively. The pressure differential $P1(t_h) - P1(t_1)$ can be used for example in the relationship described above to estimate the elastomer volume loss. Note that according to some embodiments, the volume loss is estimated for an open BOP (no strain on the elastomer). Following is an illustrative example for volume loss determination: $P1(t_0) - P1(t_1) = 150$ mpsi, $\rho = 1000$ kg/m3, $g = 9.81$ m/s$^2$, $k0 = 0$, $k1 = 0$, $k2 = 0.25$, $k3 = 0.75$, volume loss $\approx 3$ liters (2.10e-3 m$^3$).

Figure 6:
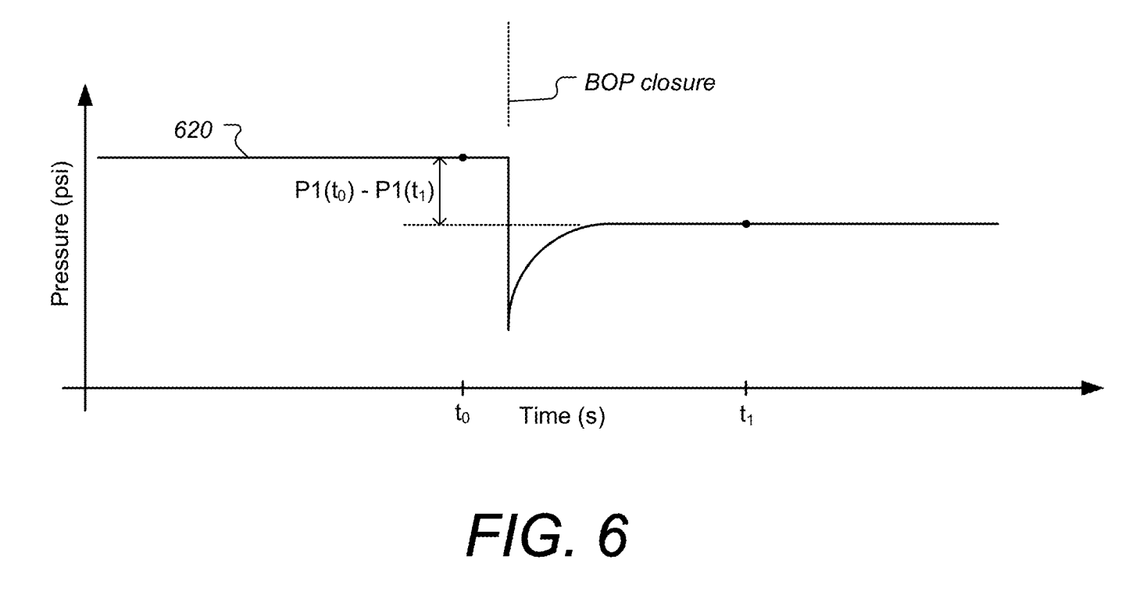
FIG. 6 is a plot illustrating aspects of detecting proper sealing of the BOP, according to some embodiments.

FIG. 6 is a plot illustrating aspects of detecting proper sealing of the BOP, according to some embodiments. In the case the P1 measurements can be used to detect proper sealing of the BOP. Note that this technique can be used for sealing integrity prior to additional well bore pressure being applied rather than as a method for leak detection at maximum well bore pressure. Curve 620 reflects P1 measurements made before, during and after a BOP closure. A condition can be defined as follows: $P1(t_0) P1(t_1) > \Delta P\_min$. P1 is the pressure measured in the central bore of the BOP below the sealing element such as by sensor 150 shown in FIG. 2. $\Delta P\_min$ is minimum differential pressure threshold/drop to ensure sealing detection. $t_0$ and $t_1$ are respectively times when the BOP is open and closed. If $P1(t_0) - P1(t_1) \leq \Delta P\_min$ then improper sealing of the BOP is indicated prior to application of additional pressure from below the BOP. Following is an illustrative example for sealing detection: $P1(t_0) - P1(t_1) = 150$ mpsi, $\Delta P\_min = 100$ mpsi. Therefore, the BOP is sealed with no additional well bore pressure.

Referring again to FIG. 4, alternatively or in addition to block 416, in block 418 more complex behaviors during the transient move of elastomer packer can be interpreted based on historical and/or simulation data.

In block 422, after the piston has reached its maximum position and before applying well pressure, P2 (t) and P1(t) can be compared to historical and/or modeling data. In an ideal case both should remain constant. However, if there is a leakage path due to elastomer wear, and if the differential pressure P2-P1 is sufficient, a flow would be induced, leading to monotonic variations of P1 and/or P2 with time.

In block 424, once well pressure is applied, P1 becomes greater than P2. Note that the difference will remain below the BOP differential pressure rating. In block 426, P1(t) and P2(t) are compared to historical and/or modeling data. Both should ideally remain constant. However, in case there is a leakage, the P2(t) variation can be used to determine flow rate (see example 1 of numerical application below), and the necessary differential pressure P1-P2 can then give an indication of microleak geometry provided fluid rheological properties are known (see example 2 of numerical application below).

Example 1—using P2(t) to determine leakage flow rate. Assumptions: annulus area: A=700 cm2 (20" riser and 5" drill pipe); fluid density: $\rho=1500$ kg/m3; flow rate: Q=3.5 mL/s=210 mL/min.

$$\frac{\delta P_2}{\delta t} = \rho g \frac{\delta h}{\delta t} = \rho g \frac{Q}{A}$$

that numerically gives a pressure variation of 45 Pa in one min (7 mpsi/min). This variation can be detected with high quality SOI pressure sensors.

Example 2—using P1-P2 to determine leak diameter. Assumptions: P1-P2=69 MPa (10000 psi); flow rate: Q=3.5 mL/s; Newtonian fluid with fluid viscosity: $\eta=0.1$ Pa·s; cylindrical microleak through the elastomer with a length of: l=30 cm; laminar flow (valid for a liquid in a small diameter leak path).

According to Poiseuille's law the radius r of the microleak channel to the power 4 can be expressed as:

$$r^4 = \frac{8 \eta l Q}{\Delta P \pi}$$

that numerically gives a radius of 250 microns for the corresponding micro leak in the elastomer.

Note that unlike with conventional leak detection systems, some of the pressure measurements described herein will benefit from relatively fast and high resolution pressure sensors. For example, during the BOP piston move, the pressures will change drastically (typically several thousand of psi in a few seconds) and the dynamic effects (e.g. fluid temperature variation and gauge response) could jeopardize the pressure data interpretation during the first minutes. Therefore, to properly examine the entire leak signature, the pressure sensor should be highly stabilized (within a few mpsi) after a few minutes. Furthermore, if we assume an acceptable leak detection threshold of 3.5 mL/s (see example 1), the pressure sensor should be capable to resolve a variation of a few mpsi. Based on the foregoing, according to some embodiments, the pressure sensors used have a dynamic response of within 100 mpsi in a few minutes; and a gauge resolution of 1-15 mpsi @ 1 Hz.

Figure 7:
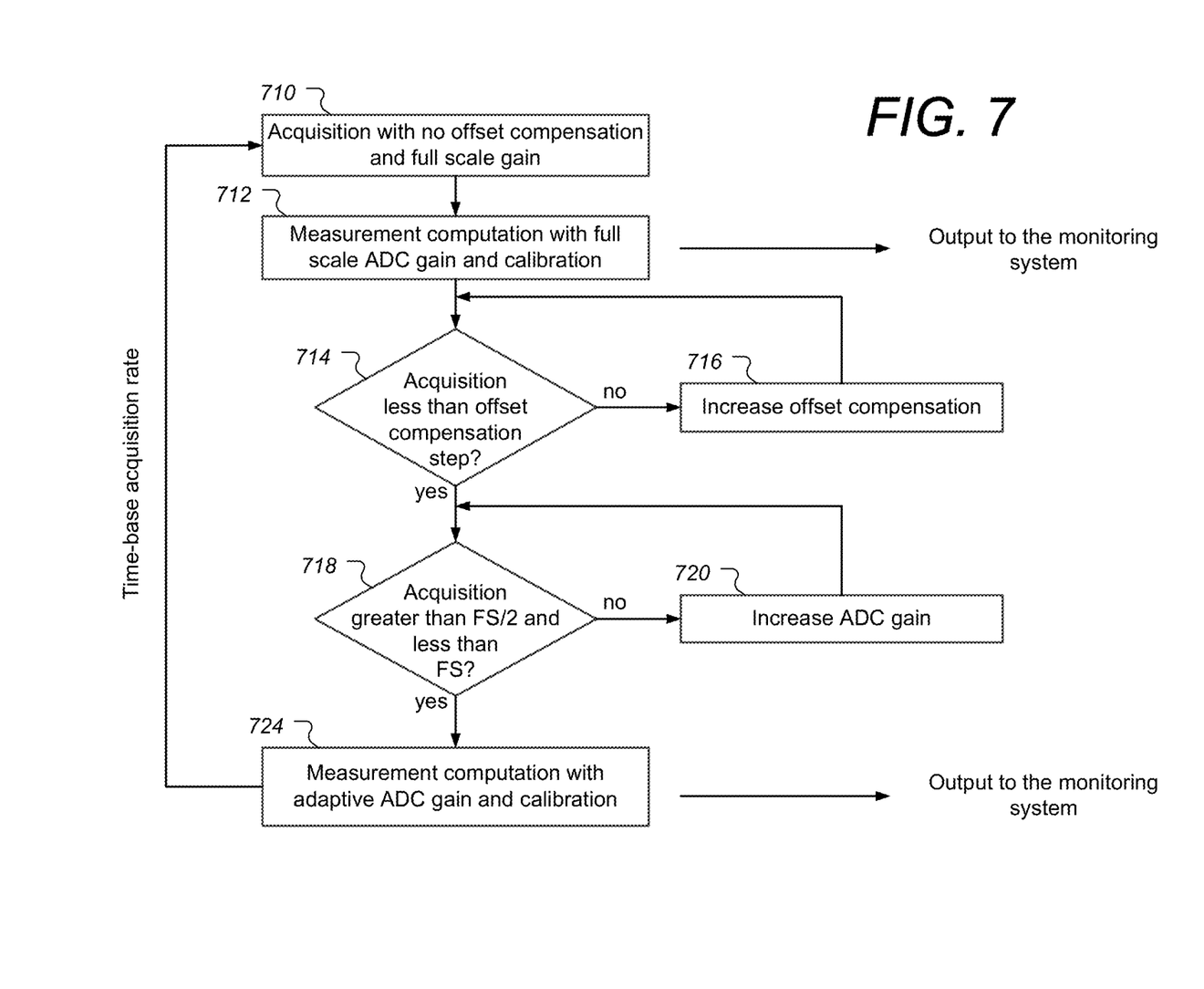
FIG. 7 is a block diagram illustrating signal-processing techniques used to enhance measurements from one or more pressure sensors, according to some embodiments.

FIG. 7 is a block diagram illustrating signal-processing techniques used to enhance measurements from one or more pressure sensors, according to some embodiments. The techniques can be applied to the signals and/or recorded data from sensors such as 150 and/or 250 to further enhance the evaluation of the elastomeric sealing elements of the BOP. As a part of the acquisition system (electronics), an algorithm shown in FIG. 7 uses adaptive Analog-to-Digital-Conversion (ADC) gain and adaptive steady-state input offset to "zoom" in on specific operating points rather than looking at relatively small changes over the full measurement range. Block 710 represents the acquisition from the sensor (e.g. in volts) without any offset compensation with full scale gain. In block 712 the measurement computation is made with the full scale gain and calibration. In 714, if the acquisition voltage is greater or equal to the offset compensation step then the offset compensation is increased (716). Otherwise, in 718 if the acquisition voltage is less than or equal to half of the full scale than in 720 the ADC gain is increased. When the acquisition voltage is greater than half of the full scale then the measurement acquisition is recorded with calibration steps (if any). Using techniques such shown in FIG. 7, increased sensitivity in psi/V with increased resolution in psi/V can be achieved. According to some embodiments, sensitivity and/or resolution could be improved by factor to 2 to 100.

While the subject disclosure is described through the above embodiments, it will be understood by those of ordinary skill in the art, that modification to and variation of the illustrated embodiments may be made without departing from the concepts herein disclosed.

What is claimed is:

1. A method of monitoring service life characteristics of an elastomer component in a BOP, the elastomer component used for sealing in a central bore of the BOP, the method comprising:
    measuring in situ on the BOP while deployed at wellsite, fluid pressure within the central bore of the BOP at a first location using a first pressure sensor; and
    estimating a service life characteristic of the elastomer component based at least in part on the in situ fluid measurement at the first location.

2. A method according to claim 1 wherein the first pressure sensor has a typical accuracy of at least $1\times10^{-3}$ of full scale and is typically stable to $10^{-4}$ of full scale in less than 10 seconds following a pressure transient.

3. A method according to claim 1 wherein the first pressure sensor has a typical accuracy of at least $1.5\times10^{-4}$ of full scale and is typically stable to $10^{-4}$ of full scale in less than 10 seconds following a pressure transient.

4. A method according to claim 1 wherein the first pressure sensor includes at least one silicon piezo resistor elements mounted on an insulating substrate.

5. A method according to claim 1 wherein the first location is below the elastomer component and the estimating of the service life characteristics of the elastomer component includes estimating elastomer volume or changes in elastomer volume based at least in part on measurements of fluid pressure from the first pressure sensor during movement of a piston of the BOP used to actuate the sealing in the central bore of the BOP.

6. A method according to claim 5 further comprising measuring position of the piston of the BOP during its movement and wherein said measurements of fluid pressure are correlated to the measurements of piston position.

7. A method according to claim 5 wherein the estimating elastomer volume or changes in elastomer volume includes determining a change in effective fluid height above the first location.

8. A method according to claim 1 further comprising measuring in situ on the BOP while deployed at wellsite, fluid pressure within the central bore of the BOP at a second location using a second pressure sensor, first location being below the elastomer component and the second location being above the elastomer component.

9. A method according to claim 8 further comprising calibrating at least one of the first and second pressure sensors based at least in part on a pressure differential between the first and second locations from measurements made by the first and second sensors while the BOP bore is not sealed, a known vertical distance between the first and second locations, and a known density of fluid within the central bore.

10. A method according to claim 8 wherein the estimating a service life characteristic includes detecting potential leakage of the sealing in the central bore due to elastomer wear based at least in part on measurements made by the first and second pressure sensors while the central bore of the BOP is in a sealed configuration.

11. A method according to claim 10 wherein the estimating a services life characteristic includes estimating a leak flow rate in cases where potential leakage is detected.

12. A method according to claim 10 wherein the estimating a services life characteristic includes estimating an effective leak channel diameter in cases where potential leakage is detected.

13. A method according to claim 10 wherein the detecting potential leakage of the sealing in the central bore due to elastomer wear is based at least in part on measurements made by the first and second pressure sensors while the central bore of the BOP is in a sealed configuration prior to and during application of wellbore pressure to the BOP.

14. The method according to claim 1 wherein the BOP is an annular type BOP.

15. The method according to claim 1 wherein the BOP is a ram type BOP.

16. The method according to claim 1 wherein the BOP is deployed in a subsea location.

17. The method according to claim 1 further comprising enhancing said in situ measurements based at least in part on offset compensation or adaptively increasing gain, and wherein said estimating is based at least in part on the enhanced measurements.

* * * * *